United States Patent
Lin et al.

(10) Patent No.: US 12,353,903 B2
(45) Date of Patent: Jul. 8, 2025

(54) SOFTWARE ISOLATION OF VIRTUAL MACHINE RESOURCES

(71) Applicant: Microsoft Technology Licensing, LLC, Redmond, WA (US)

(72) Inventors: Jin Lin, Seattle, WA (US); David Alan Hepkin, Redmond, WA (US); Michael Bishop Ebersol, Woodinville, WA (US); Stephanie Sumyi Luck, Redmond, WA (US); Jonathan Edward Lange, Seattle, WA (US); Bruce J. Sherwin, Jr., Woodinville, WA (US); Kevin Michael Broas, Kirkland, WA (US); Wen Jia Liu, New York, NY (US); Xin David Zhang, Duvall, WA (US); Alexander Daniel Grest, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 543 days.

(21) Appl. No.: 17/837,688

(22) Filed: Jun. 10, 2022

(65) Prior Publication Data
US 2023/0401081 A1 Dec. 14, 2023

(51) Int. Cl.
*G06F 9/455* (2018.01)
*G06F 9/50* (2006.01)
*G06F 12/1045* (2016.01)

(52) U.S. Cl.
CPC ........ *G06F 9/45558* (2013.01); *G06F 9/5077* (2013.01); *G06F 12/1054* (2013.01);
(Continued)

(58) Field of Classification Search
None
See application file for complete search history.

(56) References Cited

U.S. PATENT DOCUMENTS 7,334,076 B2 * 2/2008 Hendel ............... G06F 12/1036
711/6
8,327,358 B2 * 12/2012 Mangione-Smith .........
G06F 9/5077
717/121
(Continued)

FOREIGN PATENT DOCUMENTS

WO 2020182528 A1 9/2020

OTHER PUBLICATIONS

U.S. Appl. No. 63/416,283, filed Oct. 14, 2022.
Chisnall, David., "The Definitive Guide to the Xen Hypervisor", accessed on link https://www.mobt3ath.com/uplode/book/book-55475.pdf, Published on Jan. 1, 2008, retrieved on Sep. 7, 2020, 307 pages.
International Search Report and Written Opinion received for PCT Application No. PCT/US23/031783, (MS#412057-PCT01) Nov. 28, 2023, 14 pages.
(Continued)

*Primary Examiner* — Van H Nguyen
(74) *Attorney, Agent, or Firm* — Workman Nydegger

(57) ABSTRACT

Isolating resources of a virtual machine (VM) guest from a host operating system. A computer system receives an acceptance request from a guest partition corresponding to an isolated VM. The acceptance request identifies a guest memory page that is mapped into a guest physical address space of the guest partition, and a memory page visibility class. The computer system determines whether a physical memory page that is mapped to the guest memory page meets the memory page visibility class. The computer system sets a page acceptance indication for the guest memory page from an unaccepted state to an accepted state based on the physical memory page meeting the memory page visibility class.

20 Claims, 4 Drawing Sheets

(52) U.S. Cl.
CPC .............. *G06F 2009/45583* (2013.01); *G06F 2212/7201* (2013.01)

(56) References Cited

U.S. PATENT DOCUMENTS

| | | | |
|---|---|---|---|
| 8,578,385 B2* | 11/2013 | Kinsey | G06F 9/5077 |
| | | | 718/1 |
| 9,274,823 B1* | 3/2016 | Koryakin | G06F 9/45558 |
| 9,274,974 B1* | 3/2016 | Chen | G06F 12/109 |
| 9,628,279 B2* | 4/2017 | Probert | G06F 9/45558 |
| 9,740,517 B2* | 8/2017 | Shedel | G06F 9/45558 |
| 10,275,269 B1 | 4/2019 | Pratt | |
| 11,436,155 B2* | 9/2022 | Xia | G06F 9/4856 |
| 2016/0364341 A1 | 12/2016 | Banginwar et al. | |
| 2024/0126580 A1 | 4/2024 | Lin | |

OTHER PUBLICATIONS

Jin, et al., "Secure MMU: Architectural support for memory isolation among virtual machines", IEEE, Jun. 27, 2011, pp. 217-222.

Milenkoski, et al., "Virtual Secure Mode: Architecture Overview", accessed on link https://hal.science/hal-03117358v1/file/vsm_architecture_signed.pdf, Hal, published on Jan. 21, 2021, retrieved on Nov. 16, 2023, 7 pages.

U.S. Appl. No. 18/145,247, filed Dec. 22, 2022.

"International Search Report and Written Opinion Issued in PCT Application No. PCT/US23/019042", Mailed Date: Jul. 11, 2023, 11 Pages. (MS# 411562-WO-PCT).

International Preliminary Report on Patentability received for PCT Application No. PCT/US23/031783, Apr. 24, 2025, 08 pages.

* cited by examiner

SOFTWARE ISOLATION OF VIRTUAL MACHINE RESOURCES

BACKGROUND

Hypervisor-based virtualization technologies allocate portions of a computer system's physical resources (e.g., processor cores and/or time, physical memory regions, storage resources, etc.) into separate partitions, and execute software within each of those partitions. Hypervisor-based virtualization technologies therefore facilitate creation of virtual machine (VM) guests that each executes guest software, such as an operating system (OS) and other software executing therein. While hypervisor-based virtualization technologies can take a variety forms, many use an architecture comprising a hypervisor that has direct access to hardware and that operates in a separate execution environment than all other software in the system, a host partition that executes a host OS and host virtualization stack, and one or more guest partitions corresponding to VM guests. The host virtualization stack within the host partition manages guest partitions, and thus the hypervisor grants the host partition a greater level of access to the hypervisor, and to hardware resources, than it does to guest partitions.

Taking HYPER-V from MICROSOFT CORPORATION as one example, the HYPER-V hypervisor is the lowest layer of a HYPER-V stack. The HYPER-V hypervisor provides the basic functionality for dispatching and executing virtual processors for VM guests, but it relies on the HYPER-V host stack for many other aspects of VM guest virtualization. The HYPER-V hypervisor takes ownership of hardware virtualization capabilities (e.g., second-level address translation (SLAT) processor extensions such as Rapid Virtualization Indexing from ADVANCED MICRO DEVICES, or Extended Page Table from INTEL; an input/output (I/O) memory management unit (IOMMU) that connects a direct memory access-capable I/O bus to main memory; processor virtualization controls), and it provides a set of interfaces to allow the HYPER-V host stack to leverage these virtualization capabilities to manage VM guests. The HYPER-V host stack, on the other hand, contains a majority of HYPER-V functionality. The HYPER-V host stack contains components that span kernel and user mode of a host OS executing within the host partition, and that provide general functionality for VM guest virtualization (e.g., memory management, VM guest lifecycle management, device virtualization).

With current hypervisor-based virtualization architectures, the host OS (and the virtualization stack running therein) assumes it has full access to each VM guest, including all of the VM guest's state. For example, host virtualization stacks expect to be able to read from and write to any portion of a guest partition's memory (e.g., for purposes of device I/O), and expect to be able to read and manipulate a guest partition's processor registers (e.g., for the purposes of device emulation).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method, implemented at a computer system that includes a processor, for isolating resources of a VM guest from a host OS, the method including: receiving an acceptance request from a guest partition corresponding to an isolated VM guest, the acceptance request identifying: a guest memory page that is mapped into a guest physical address (GPA) space of the guest partition, and a memory page visibility class; and setting a page acceptance indication for the guest memory page from an unaccepted state to an accepted state based on a physical memory page mapped to the guest memory page meeting the memory page visibility class.

In some aspects, the techniques described herein relate to a computer system for isolating resources of a VM guest from a host OS, including: a processor; and a computer storage media that stores computer-executable instructions that are executable by the processor to cause the computer system to at least: receive an acceptance request from a guest partition corresponding to an isolated VM guest, the acceptance request identifying: a guest memory page that is mapped into a GPA space of the guest partition, and a memory page visibility class; and set a page acceptance indication for the guest memory page from an unaccepted state to an accepted state based on a physical memory page mapped to the guest memory page meeting the memory page visibility class.

In some aspects, the techniques described herein relate to a computer program product including a computer storage media that stores computer-executable instructions that are executable by a processor to cause a computer system to isolate resources of a VM guest from a host OS, the computer-executable instructions including instructions that are executable by the processor to cause the computer system to at least: receive an acceptance request from a guest partition corresponding to an isolated VM guest, the acceptance request identifying: a guest memory page that is mapped into a GPA space of the guest partition, and a memory page visibility class; and set a page acceptance indication for the guest memory page from an unaccepted state to an accepted state based on a physical memory page mapped to the guest memory page meeting the memory page visibility class.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

In cloud computing architectures, customers' VM guests and the data they operate on are hosted by cloud providers within virtualized environments. As cloud computing becomes commonplace, providing strong assurances around the confidentiality and integrity of hosted VM guests, and their data, is of increased importance to cloud providers and their customers. For example, being able to provide strong assurances around the security and privacy of hosted VM guests enables security-focused customers to move their workloads to the cloud. In addition, providing stronger isolation and protection of VM guests can also be beneficial to on-premises customers that manage their own data centers, because stronger isolation and protection of VM guests protects against malicious infiltrators into an on-premises virtualization fabric.

At least some embodiments described herein are directed to a software-based architecture, referred to herein as an IVM architecture, to provide IVM guests. The IVM architecture enables highly secure and confidential computing by fully isolating VM guest state (e.g. registers, memory) from a host operating system (OS) executing within a host partition, as well as from an entity that manages a computing system on which the IVM guests are hosted. To achieve the foregoing, the IVM architecture described herein introduces a new security boundary between the hypervisor and the host virtualization stack. In embodiments, this new security boundary is enforced by the hypervisor, by restricting which VM guest resources can be accessed by the host OS (and, in turn, the host virtualization stack) to ensure the integrity and confidentiality of an IVM guest.

In addition to these security benefits, in embodiments, the IVM architecture described herein provides a benefit of supporting existing guest OSs (e.g. without requiring changes to the guest OS kernel and boot loader). For example, in embodiments, existing guest OSs can be supported via enlightened OS drivers. Additionally, because it is software-based, the IVM architecture described herein is operable on existing computing hardware. Thus, for example, cloud providers can leverage the security benefits described herein without needing to wait for the development, or purchase, of new hardware systems that are designed with hardware-based VM guest isolation.

Figure 1:
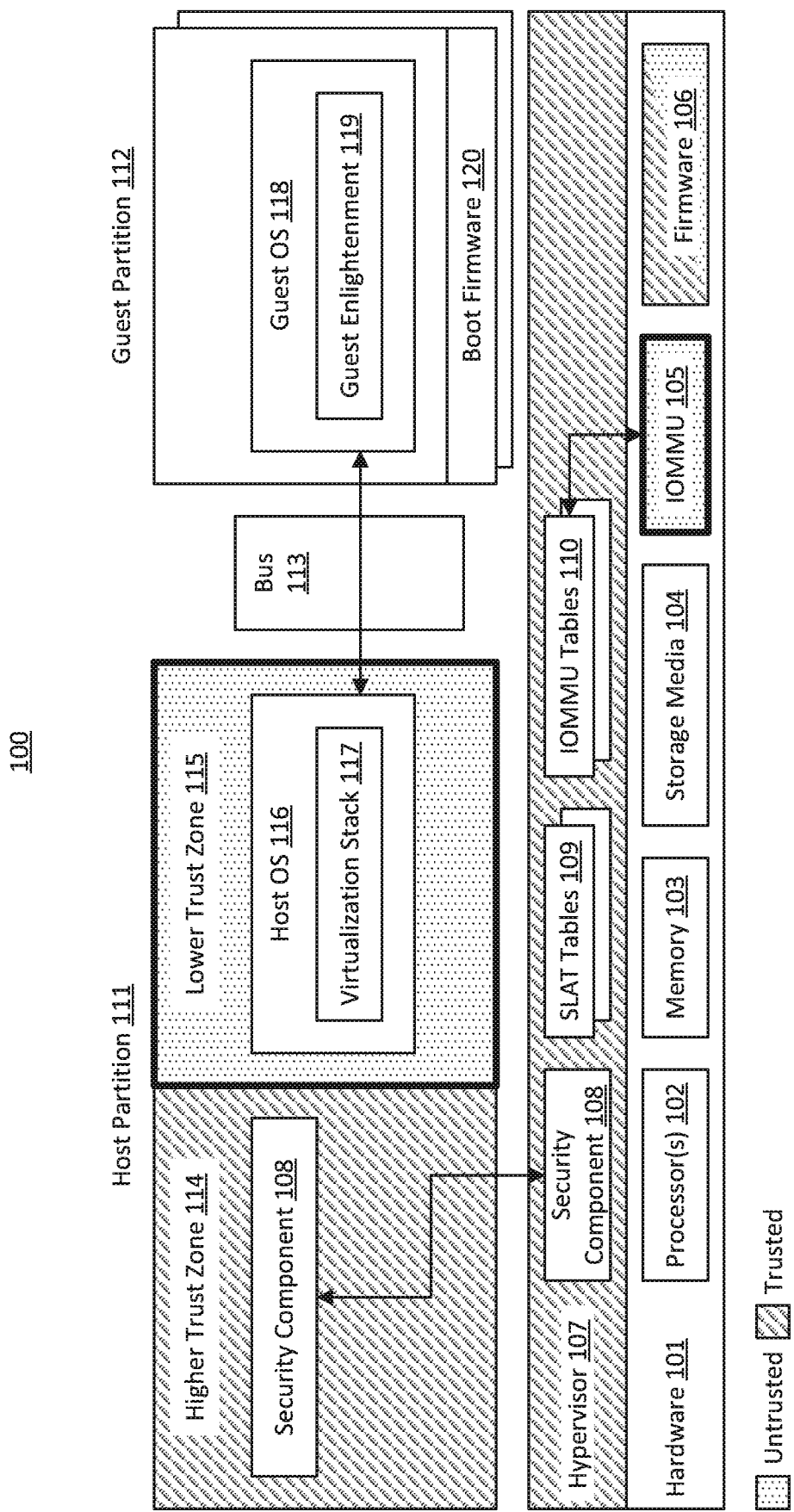
FIG. 1 illustrates an example computer architecture that facilitates software isolation of VM resources.

FIG. 1 illustrates an example computer architecture 100 (e.g., including the IVM architecture) that facilitates software isolation of VM guest resources. As shown, computer architecture 100 includes hardware 101 (e.g., a computer system) comprising a processor 102 (e.g., a single processor, or a plurality of processors), memory 103 (e.g., system or main memory), storage media 104 (e.g., a single computer-readable storage medium, or a plurality of computer-readable storage media), an IOMMU 105, and firmware 106 (e.g., stored on storage media 104, and/or stored on a dedicated memory device such as a read-only memory). Although not shown, hardware 101 may also include other hardware devices, such as a trusted platform module (TPM) for facilitating measured boot features, a network interface (e.g., one or more network interface cards) for interconnecting (via a network) to one or more other computer systems, video display interface(s), user input interface(s), and the like.

As shown, in computer architecture 100, a hypervisor 107 executes directly on hardware 101. In general, the hypervisor 107 partitions hardware resources (e.g., processor 102, memory 103, I/O resources) among a host partition 111 that executes a host OS 116, as well as a guest partition 112 (or, as shown, a plurality of guest partitions) that executes a guest OS 118. In the description herein, the term "VM guest" is used to refer to the "guest partition," and the term "IVM guest" is used to indicate when a VM guest is an isolated VM guest operating in an isolated guest partition under the IVM architecture described herein. The hypervisor 107 also enables regulated communications between partitions via a bus 113 (e.g., a VM BUS). As shown, the host OS 116 includes a virtualization stack 117 which manages VM guest virtualization (e.g., memory management, VM guest lifecycle management, device virtualization) via one or more application program interface (API) calls to the hypervisor 107.

Computer architecture 100 includes a security component 108, which provides functionality for transforming any VM guest, such as guest partition 112, into an IVM guest by isolating resources (e.g., registers within processor 102, portions of memory 103, I/O resources) allocated to the VM guest from the host OS 116 (and, in turn, from the virtualization stack 117). In embodiments, the security component 108 has privileged access to VM guest state. In computer architecture 100, the security component 108 is shown as operating within the hypervisor 107; thus, in some embodiments, functionality of the security component 108 is partially or fully implemented within the hypervisor 107.

In computer architecture 100, the host partition 111 is shown as comprising a higher trust zone 114 and a lower trust zone 115. Here, the host OS 116 operates within the lower trust zone 115 and the security component 108 operates within the higher trust zone 114; thus, in some embodiments, functionality of the security component 108 is partially or fully implemented within the higher trust zone 114. In embodiments, the higher trust zone 114 is isolated from the lower trust zone 115 based at least on mappings within SLAT tables 109 that map system physical addresses (SPAs) to guest physical address (GPAs), and within IOMMU translation tables (IOMMU tables 110). As a result, the higher trust zone 114 (and the security component 108) is isolated from the lower trust zone 115 (and the host OS 116 and software executing thereon such as the virtualization stack 117). In one example, the hypervisor 107 is the HYPER-V hypervisor and supports virtualization-based security (VBS) to sub-partition partitions into virtual trust levels (VTLs), the higher trust zone 114 operates under VBS in a higher privileged VTL 0, and the lower trust zone 115 operates under VBS in a lower privileged VTL 1.

In embodiments, using the security component 108, the IVM architecture introduces a new security boundary between the hypervisor 107 and the host OS 116. This new security boundary is illustrated using a heavy line surrounding the lower trust zone 115, and a heavy line surrounding the IOMMU 105. In embodiments, due to this new security boundary, the only components of computer architecture 100 that are within a virtualization trusted computing base (TCB), upon which an IVM guest depends, are trusted firmware components within firmware 106, the hypervisor 107, and components within the higher trust zone 114 of the host partition 111 (if present). In an implementation using the HYPER-V stack, and using WINDOWS as the host OS 116, introduction of this new security boundary reduces the number of lines of code within the virtualization TCB by over 95%.—significancy reducing the potential attack surface. In addition to reducing a size of the virtualization TCB, the IVM architecture described herein also provides a well-defined and scoped security boundary between the virtualization TCB and the rest of the system. This security boundary is defensible, and greatly simplifies validation of a virtualization host's TCB.

Consistent with this new security boundary, in computer architecture 100 the hypervisor 107 and the higher trust zone 114 (including components operating within, such as the security component 108) are illustrated as being trusted and within the virtualization TCB, while the lower trust zone 115 (including components operating within, such as the host OS 116 and the virtualization stack 117) are illustrated as being untrusted and outside of the virtualization TCB. Notably, in embodiments in which the host partition 111 lacks a separation into a higher trust zone 114 and a lower trust zone 115 (and, thus, the security component 108 is fully implemented within the hypervisor 107), then the entirety of the host partition 111 would be within the virtualization TCB. Either way, with this new security boundary, the host OS 116 is considered to be untrusted and is outside of the virtualization host TCB. This provides a well-defined and defensible security boundary that strongly isolates IVM guests from the host OS 116.

Additionally, DMA devices behind the IOMMU 105 are illustrated as being outside of the virtualization TCB, and the firmware 106 is illustrated as being both partially within and partially outside of the virtualization TCB. In embodiments, the amount of the firmware 106 that is within the virtualization TCB varies based on whether the computer architecture 100 supports Dynamic Root of Trust for Measurement (D-RTM). On systems that leverage D-RTM, the firmware components within the virtualization TCB can be limited to microcode of the processor 102 and the firmware used for D-RTM launch. This is because D-RTM provides the ability to eliminate a Basic Input Output System (BIOS) and runtime firmware components— including, e.g., System Management Mode (SMM) and Unified Extensible Firmware Interface (UEFI) runtime services—from the virtualization TCB. On systems that don't support D-RTM, the BIOS and runtime firmware components may be within the virtualization TCB.

In embodiments, with the IVM architecture described herein, the hypervisor 107 continues to allow the host OS 116 to control the assignment of processor, memory, and I/O resources to a VM guest as would be conventional. This means that the host OS 116 is still responsible for governing resource usage of IVM guests, and that the host OS 116 can use existing allocation policies for controlling how much compute resources an IVM guest receives. This also means that the host OS 116 can potentially deny access to resources by an IVM guest, and thus prevent an IVM guest from performing well, or performing at all. Thus, under the IVM architecture, the host OS 116 still maintains control of allocation of resources among the hardware 101. However, with the new security boundary introduced by the IVM architecture, the hypervisor 107 restricts the host OS 116 from reading or modifying the contents of an IVM guest's state. This includes restricting the host OS 116 from accessing the contents of an IVM guest's virtual processor state, as well as restricting the host OS 116 from accessing an IVM guest's memory contents.

Figure 2:
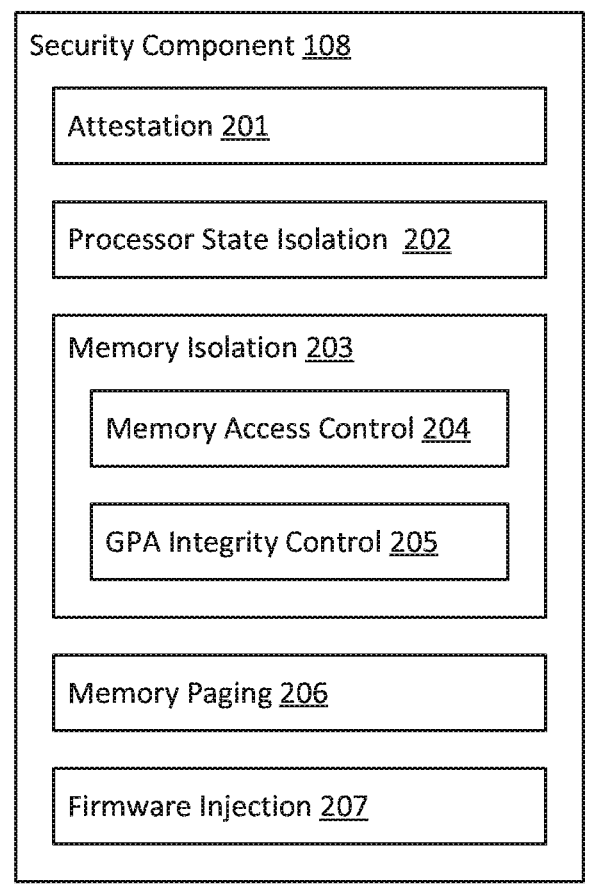
FIG. 2 illustrates an example of an isolated VM (IVM) security component.

FIG. 2 illustrates an example 200 of an IVM security component, such as security component 108 of FIG. 1. Each internal component of the security component 108 depicted in FIG. 2 represents various functionalities that the security component 108 might implement in accordance with various embodiments described herein. It will be appreciated, however, that the depicted components—including their identity and arrangement—are presented merely as an aid in describing example embodiments of the security component 108. Notably, the internal component of the security component 108 could be distributed in a variety of manners between the higher trust zone 114 and/or the hypervisor 107.

In example 200, the security component 108 includes an attestation component 201. In embodiments, the attestation component 201 provides attestation and key management functionality that enables a party operating the computer architecture 100 (a hoster) to be fully removed from the virtualization host's TCB. Because the virtualization stack 117 is not trusted, the virtualization stack 117 cannot be relied upon to ensure that an IVM guest is not tampered with prior to the IVM guest being launched. Furthermore, the guest OS 118 running inside of an IVM guest cannot simply query the hypervisor 107 to determine if it was launched securely, as it can never guarantee that it's running on a secure host. Thus, in order for an IVM guest to launch securely, a remote server is responsible for attesting to the launch of the IVM guest and releasing the IVM guest's secrets (e.g. encryption keys) to the software running inside of the IVM guest. Thus, using the attestation component 201, a tenant operating an IVM guest can securely verify the authenticity and security of a virtualization host on which the tenant's IVM guest operates, and the tenant can release keys to the virtualization host and be assured the party operating the computer architecture 100 is unable to access the keys or read/modify the IVM guest's state without detection.

In example 200, the security component 108 also includes a processor state isolation component 202. Currently, many hypervisors are responsible for managing a VM guest's processor state, and allow the host OS the ability to read and modify a VM guest's processor state for the purposes of emulating devices. In embodiments, the processor state isolation component 202 fully isolates an IVM guest's processor state from the host OS 116. In particular, the processor state isolation component 202 prevents the host OS 116 from reading from or writing to an IVM guest's registers—including the IVM guest's instruction and stack pointers.

In embodiments, the processor state isolation component 202 also prevents the host OS 116 from setting intercepts for events that could result in leaking sensitive information to the host OS 116. In embodiments, the processor state isolation component 202 also limits the kinds of interrupts and exceptions the host OS 116 can generate for an IVM guest. In one example, the processor state isolation component 202 allows for synthetic interrupts to be generated by the host OS 116 for the purposes of para-virtualized communication via the bus 113. However, the processor state isolation component 202 does not allow for emulated interrupts or exceptions to be generated by the host OS 116, because allowing the host OS 116 the ability to generate emulated interrupts or exceptions would present an attack surface, as an IVM guest would be susceptible to unexpected interrupts and exceptions at arbitrary points during its execution.

In example 200, the security component 108 also includes a memory isolation component 203. In embodiments, the memory isolation component 203 isolates the memory of an IVM guest from components within outside of the security boundary illustrated in FIG. 1. This includes isolating the memory of an IVM guest from the host OS 116 and from DMA devices behind the IOMMU 105. Additionally, in embodiments, the memory isolation component 203 protects the integrity of each IVM guest's GPA space (e.g., the address space that the IVM guest sees as its own physical address space).

In computer architecture 100, the host OS 116 is responsible for memory management (e.g., via the virtualization stack 117). Thus, the host OS 116 is responsible for allocating physical memory for IVM guests, and assigning physical memory to VM guests (e.g., guest partition 112) corresponding to IVM guests. The host OS 116 also controls the GPA space for an IVM guest, and decides where to map pages in an IVM guest's GPA space. However, to ensure isolation and integrity of an IVM guest's memory, the memory isolation component 203 enforces a set of rules on the host OS 116 when managing an IVM guest's memory. In embodiments, these rules are centered around memory access controls (MACs) and GPA integrity controls. Thus, the memory isolation component 203 is illustrated as including a MAC component 204 and a GPA integrity control component 205. In embodiments, the MAC component 204 provides facilities for controlling which portions of memory the host OS 116 can access for an IVM guest, while the GPA integrity control component 205 provides facilities that enable an IVM guest to be assured of its GPA space integrity at all times.

Referring to the MAC component 204, for memory pages that have been assigned to an IVM guest, the IVM architecture introduces the concept of memory page visibility classes. In embodiments, the MAC component 204 records host OS visibility for a memory page as one or more per-page host visibility attributes within the SLAT tables 109. For memory pages that are mapped into an IVM guest's GPA space, these per-page host visibility attribute(s) define the amount of access that the host OS 116 is allowed to each memory page. In embodiments, these memory page visibility classes include exclusive memory, shared read-only memory, and shared read/write memory. In embodiments, these memory page visibility classes define various attributes around the accessibility and management of a memory page, including the host visibility attribute(s) of a memory page.

Referring to exclusive memory, in embodiments, exclusive memory is physical memory (e.g., within memory 103) that has been allocated by the host OS 116 for exclusive use by an IVM guest. Thus, conceptually, an IVM guest can be thought of as "owning" any physical memory pages that have been allocated to it as exclusive memory. In embodiments, an IVM guest gets full access privileges (e.g., read, write, and execute) to physical memory pages that have been allocated to it as exclusive memory. In embodiments, the host OS 116 allocates physical memory to be used for an IVM guest's memory, and then it makes one or more API calls to the hypervisor 107 to assign physical memory for use as an IVM guest's memory. When the host OS 116 assigns a memory page as exclusive to an IVM guest, the MAC component 204 removes the host OS 116's access to that memory page. This ensures the contents of an IVM guest's exclusive memory pages are not accessible by the host OS 116. Thus, the host OS visibility for IVM guest's exclusive memory pages is no access. In embodiments, the MAC component 204 enforces host OS visibility by controlling SLAT tables 109 for the host OS 116 (e.g., host second-level page tables) and the IOMMU tables 110 for DMA devices. Thus, when the host OS 116 allocates a physical memory page and assigns it to an IVM guest for exclusive use by the IVM guest, the MAC component 204 updates SLAT tables 109 for the host OS 116 to prevent access to the memory page by the host OS 116, and updates IOMMU tables 110 to prevent access to the memory page by DMA devices and their downstream consumers.

In embodiments, the host OS 116 cannot regain ownership/control of an IVM guest's exclusive memory page until the memory page is successfully unmapped from the IVM guest's GPA space. In embodiments, as part of unmapping an exclusive memory page from the IVM guest's GPA space, the MAC component 204 wipes/clears the contents of the memory page (e.g., by zeroing the memory page, by writing a pattern of bits to the memory page, by writing random bits to the memory page, by deleting an encryption key associated with the memory page).

In embodiments, the MAC component 204 enforces a set of rules to ensure the privacy and integrity of exclusive memory. In embodiments, these rules require that an IVM guest's exclusive memory page is only mapped/owned by a single VM guest at a time, that an IVM guest's exclusive memory page is only mapped to a single GPA of the IVM guest, that the contents of an IVM guest's exclusive memory page are wiped before the memory page is released back to the host OS 116, and that an IVM guest's exclusive memory pages are wiped on system reset (e.g., reset of the IVM guest).

As noted, exclusive memory pages are not visible to the host OS 116 by default. However, there are cases where the guest OS 118 inside of an IVM guest may need to give the host OS 116 access to some of its exclusive memory pages (e.g., for the purposes of I/O). To facilitate this, in embodiments the MAC component 204 allows an IVM guest to change host visibility on a per-page basis for exclusive memory pages. In an example, the MAC component 204 exposes an API to the IVM guest that allows the IVM guest to call the hypervisor 107 to control the host visibility for its exclusive memory pages (e.g., via call(s) from a guest enlightenment 119, such as a driver operating in the guest OS 118). In embodiments, when an IVM guest grants the host visibility to an exclusive memory page, or removes host visibility from a memory page, the MAC component 204 updates SLAT tables 109 for the host OS 116 and IOMMU tables 110 to grant or deny the host OS 116 access to the memory page.

Referring to shared read-only memory, shared read-only memory is defined as host OS 116 memory that is read-only both to the host, as well as to one or more VM guests. This makes shared read-only memory appropriate for scenarios like direct map, in which the host OS 116 wishes to direct map image pages into one or more VM guests. In embodiments, in order to map a shared read-only page into a VM guest, the host OS 116 first designates the memory page as read-only by invoking a call to inform the hypervisor 107. The host OS 116 then maps the memory page into a VM guest as a shared read-only page. In embodiments, while mapping a shared read-only memory page into a VM guest, the host OS 116 continues to have read access the memory page. Thus, in embodiments, a shared read-only memory page is always host visible for read access, and a VM guest cannot change the host visibility attribute for a shared, read-only memory page. In embodiments, a shared read-only memory page can be mapped into multiple VM guests, and it can be mapped at multiple different GPAs within the same VM guest.

Referring to shared read-write memory, shared read-write memory is defined as host OS 116 memory that is read-write both to the host OS 116 as well as to VM guests. Thus, a shared read-write page is always host visible for read and write access, and a VM guest cannot change the host visibility attribute for a shared read-write page. As will be appreciated, a VM guest can make no assumptions about the contents of shared read-write memory, as the host OS 116 can changing the contents at any time. In embodiments, shared read-write memory is used by the host OS 116 for setting up memory regions for sharing data between a VM guest and the host OS 116.

Referring to the GPA integrity control component 205, the GPA integrity control component 205 enables IVM guests to have some guarantees around the integrity and behavior of their GPA space. To ensure the integrity of an IVM guest's memory, the IVM architecture introduces the concept of "acceptance" for memory pages that are mapped into an IVM guest's GPA space. With this acceptance model, an IVM guest accepts a memory page prior to accessing it. In embodiments, if an IVM guest attempts to access a memory page that it has not previously accepted, the hypervisor 107 generates a fault into the guest (e.g., on X64 platforms, the hypervisor 107 may generate a #VE exception).

In embodiments, an IVM guest accepts a memory page by making one or more API calls (e.g., using the guest enlightenment 119) that are handled by the GPA integrity control component 205, specifying the GPA to accept and an expected attribute or attributes of the GPA (e.g., indicating a class of memory it expects for the memory page at the GPA). The GPA integrity control component 205 then determines if the physical memory page mapped by the host OS 116 to the specified GPA meets the criteria of the indicated class of memory, and marks the memory page as accepted (when the GPA meets the criteria of the indicated class of memory) or unaccepted (when the GPA does not meet the criteria of the indicated class of memory). In embodiments, the GPA integrity control component 205 marks a memory page as accepted or unaccepted by setting or clearing a flag or bit in SLAT tables 109 for the IVM guest. In one embodiment, a value of one indicates acceptance, and a value of zero indicates a lack of acceptance. Thus, if the IVM guest is expecting one class of memory to be mapped at a particular GPA, but the host OS 116 has actually mapped a different class of memory, the accept operation will fail resulting in the memory page being marked as unaccepted. In embodiments, the hypervisor 107 prohibits the host OS 116 from marking a memory page as accepted; thus, only IVM guests, via the GPA integrity control component 205, are capable of accepting memory pages on their own behalf.

In embodiments, the GPA integrity control component 205 also protects against the host OS 116 maliciously remapping an IVM guest's pages while the IVM guest is using the memory pages, which can cause undetected corruption or unexpected behavior. For example, whenever the host OS 116 changes which physical memory page maps to a GPA for an IVM guest, the GPA integrity control component 205 sets the accepted state of the GPA memory page to unaccepted. Thus, if the host OS 116 attempts to remap a GPA from one SPA to a different SPA, the GPA integrity control component 205 clears the accepted state of the memory page, and any future attempt by the IVM guest to access the GPA will result in a fault.

As will be appreciated in view of the description herein, this memory acceptance model may not prevent the host OS 116 from maliciously modifying an IVM guest's GPA space; however, this memory acceptance model does ensure that an IVM guest is made aware of any unauthorized changes to its GPA space. For example, an IVM guest can accept all of its addressable memory pages during boot, and begin using its memory. Then, if the host OS 116 changes an SPA to GPA mapping for the IVM guest, the IVM guest will be notified as the next access to the GPA will generate a fault. In embodiments, the acceptance model allows an IVM guest to coordinate with the host OS 116 when it wishes to allow for changes to occur in its GPA space for scenarios like adding and removing memory.

In example 200, the security component 108 also includes a memory paging component 206. In embodiments, memory paging is a special case where IVM architecture allows the host OS 116 to make changes to a running IVM guest's GPA space without coordination with the guest OS 118. To facilitate memory paging, the memory paging component 206 enforces a defined paging flow in which the host OS 116 cooperates. In particular, the memory paging component 206 records integrity information (e.g., a hash, a checksum) of a memory page's contents during page-out, and then uses this integrity information to validate the contents of a memory page on page-in, which protects against the host OS 116 maliciously modifying the page contents. In some embodiments, such as when paging memory pages that are not host visible (e.g. exclusive memory pages that aren't host visible), the memory paging component 206 also encrypts memory page contents of during page-out, and decrypts the memory page contents of the page during page-in (e.g., using an encryption key specific to the IVM guest).

In some environments, when a VM guest boots, the host OS injects boot firmware (e.g., a UEFI BIOS) into the VM guest's memory to "boot" the OS in the VM guest. Thus, to a guest OS inside of a VM guest, the boot process looks substantially the same as it does on a physical machine, and the same OS boot loaders can be used in VM guests as on a physical machine. However, the IVM architecture described herein moves the host OS 116 out of an IVM guest's TCB, so the host OS 116 can no longer inject arbitrary firmware into the IVM guest, as this would be insecure. In addition, the host OS 116 cannot be relied upon to serve as the root of trust for launch of the IVM guest for attestation purposes. A design principle of IVM guests is that the tenant has full control over all of the code running in the IVM guest. Thus, in the IVM architecture described herein, the tenant has control over the firmware running inside of their IVM guests. Furthermore, the IVM architecture provides the tenant a way of validating that the firmware loaded in their IVM guests is the proper firmware through measurement and attestation of the firmware.

In example 200, the security component 108 also includes a firmware injection component 207. In embodiments, the firmware injection component 207 facilitates firmware injection within the IVM architecture, and allows for different models for injecting boot firmware into an IVM guest. In a first model, a tenant owning an IVM guest relies on the host OS 116 to provide a known good boot firmware image. In order to make this first model secure, the tenant needs to be confident that the boot firmware provided by the host OS 116 a known good image, and that it doesn't contain malicious/compromised code. In embodiments, this is accomplished by providing open-source boot firmware images built from a public open-source repository. This allows for tenants that wish to rely on provided boot firmware to audit the firmware's contents and know exactly what's contained inside of the boot firmware image. In other embodiments, a tenant owning an IVM guest provides their own boot firmware image to be used for the IVM guest. In embodiments, in order to distribute boot firmware, a defined boot firmware image format includes a binary firmware blob to load into the IVM guest's memory prior to IVM guest start-up, and metadata that specifies, e.g., where the boot firmware image should be loaded in the IVM guest's GPA space, and an offset into the boot firmware image for where execution should start.

Figure 3:
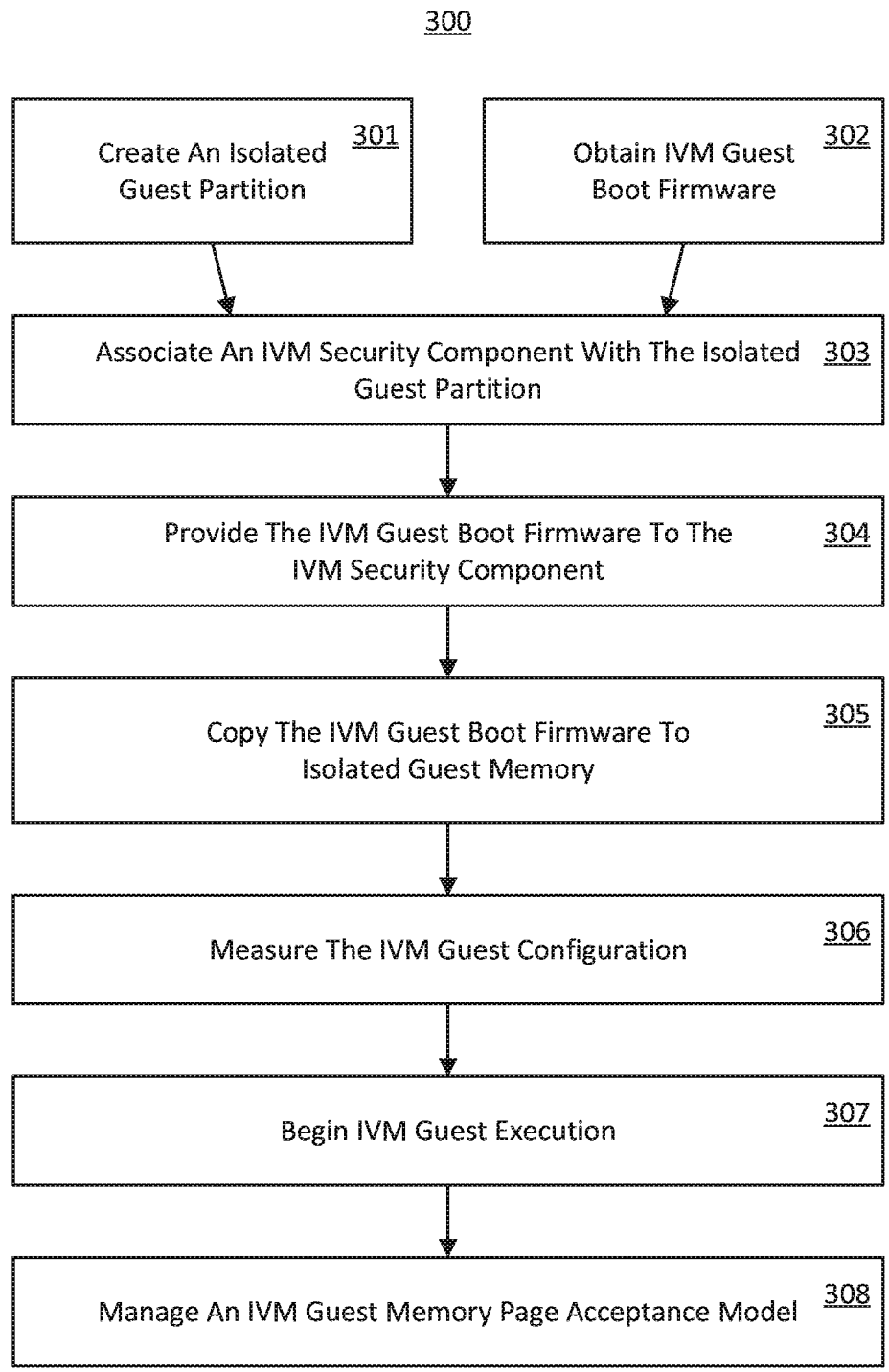
FIG. 3 illustrates an example of phases of an IVM guest lifecycle.

FIG. 3 illustrates an example 300 of phases of an IVM guest lifecycle. As shown in example 300, an IVM guest lifecycle includes a phase 301 of creating an isolated guest partition (e.g., guest partition 112), in which the virtualization stack 117 invokes APIs of the hypervisor 107 to create guest partition 112 (an IVM guest). During this initialization phase of the IVM guest, the virtualization stack 117 goes through the conventional steps for initializing a partition with the hypervisor 107, including allocating and assigning physical memory to the IVM guest. As will be appreciated in view of the foregoing description of the MAC component 204 and the GPA integrity control component 205, all memory pages assigned to the IVM guest will not have yet been accepted by the IVM guest, and thus these memory pages will not yet be accessible by the IVM guest.

The IVM guest lifecycle also includes a phase 302 of obtaining IVM guest boot firmware (e.g., boot firmware 120). As shown, there is no ordering required between phase 301 and phase 302. At phase 302, the virtualization stack 117 is provided with an initial boot firmware image for the IVM guest to load into memory. This initial boot firmware image includes a bootloader, which is where the IVM guest will begin executing. This initial boot firmware image is either an image specified by the IVM guest's owner, or a standard image provided by the host OS 116. This allows a user to specify their own boot firmware image or use a standard boot firmware image provided by a virtualization product or host.

The IVM guest lifecycle also includes a phase 303 of associating an IVM security component with the isolated guest partition. At phase 303, the virtualization stack 117 launches an instance of the security component 108 for the IVM guest, and associates this instance with the IVM guest.

The IVM guest lifecycle also includes a phase 304 of providing the IVM guest boot firmware to the IVM security component. At phase 304, virtualization stack 117 provides the boot firmware image to the security component 108, and designates where the boot firmware image should be loaded in the IVM guest's GPA space.

The IVM guest lifecycle also includes a phase 305 of copying the IVM guest boot firmware to isolated guest memory. At phase 305, the firmware injection component 207 copies the boot firmware image into the appropriate place in the IVM guest's GPA space (e.g., boot firmware 120). In connection with this, the firmware injection component 207 (or the GPA integrity control component 205) changes the acceptance state of the GPA memory pages containing the boot firmware image to be "accepted," thus allowing the IVM guest to access these boot firmware image memory pages.

Once the boot firmware has fully been established, the virtualization stack 117 indicates to the hypervisor 107 that the IVM guest is now ready to begin execution. At this point, the virtualization stack 117 is no longer be able to manipulate the configuration of the IVM guest or access the IVM guest's exclusive memory.

The IVM guest lifecycle also includes a phase 306 of measuring the IVM guest configuration. At phase 306, the attestation component 201 measures the configuration of the IVM guest, including the IVM guest's initial boot firmware image.

The IVM guest lifecycle also includes a phase 307 of beginning IVM guest execution. At phase 307 the security component 108 begins execution of the IVM guest at the start of the IVM guest's initial bootloader. Thus, as this phase, the IVM guest is running. The only memory pages that the IVM guest can access are the memory pages that were initialized as part of injecting the initial boot firmware image.

The IVM guest lifecycle also includes a phase 308 of managing an IVM guest memory page acceptance model. At phase 308, the IVM guest accepts additional memory pages using API call(s) handed by the GPA integrity control component 205. In some embodiments, this involves the initial bootloader querying the host OS 116 for memory configuration information, and then accepting pages based on the IVM guest's memory configuration reported by the host OS 116. As noted in connection with the description of the acceptance model, if there is a disparity in what the host OS 116 reports and what the IVM guest is able to accept, this will be detected during the accept, as the acceptance will fail.

Although not expressly illustrated, when an IVM guest is stopped, its memory will be reclaimed from the hypervisor 107 by the virtualization stack 117. As part of the reclamation, the MAC component 204 will wipe the contents of all of the IVM guest's exclusive memory pages prior to granting the host OS 116 access to the memory contents.

Operation of computer architecture 100 is now described in connection with FIG. 4, which illustrates a flow chart of an example method 400 for isolating resources of a VM guest (e.g., guest partition 112) from a host OS (e.g., host OS 116 within host partition 111). In embodiments, instructions for implementing method 400 are encoded as computer-executable instructions (e.g., security component 108) stored on a computer storage media (e.g., storage media 104) that are executable by a processor (e.g., processor 102) to cause a computer system (e.g., hardware 101) to perform method 400.

The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Figure 4:
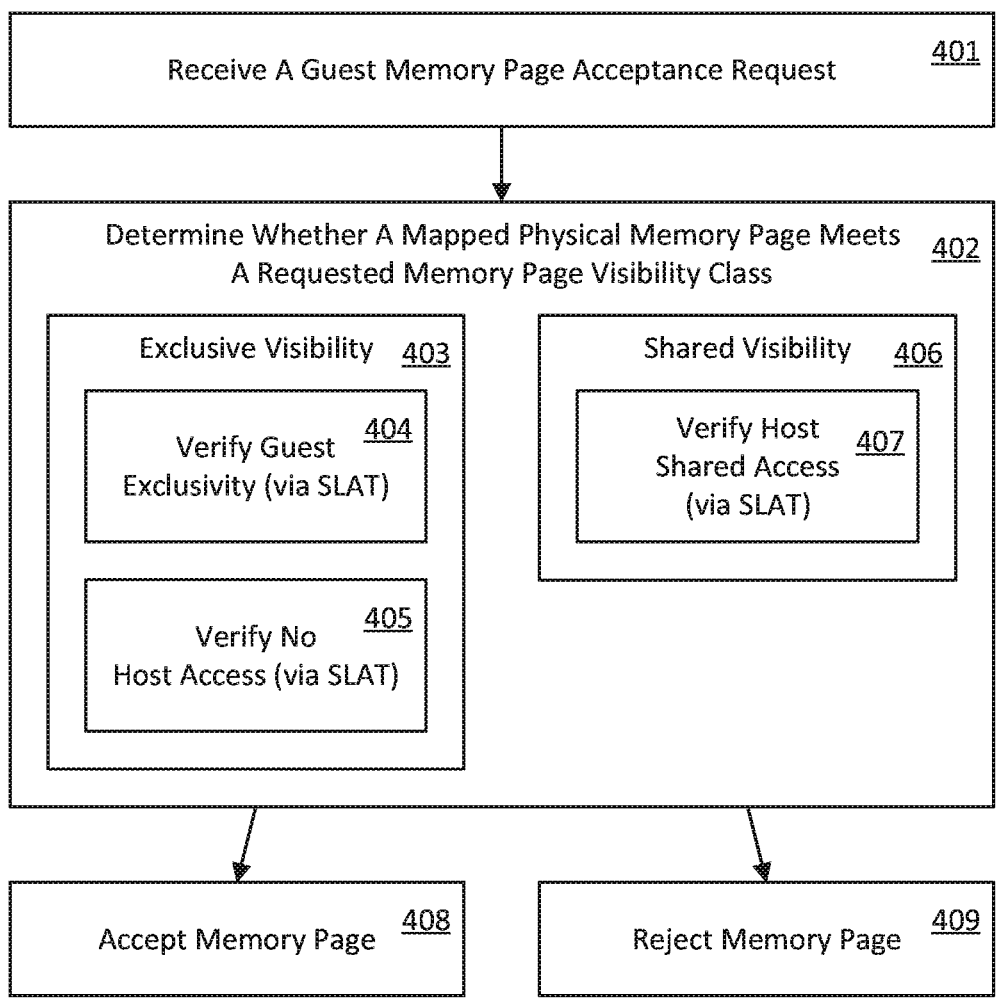
FIG. 4 illustrates a flow chart of an example method for isolating resources of a VM guest from a host OS.

Referring to FIG. 4, method 400 comprises an act 401 of receiving a guest memory page acceptance request. In some embodiments, act 401 comprises receiving an acceptance request from a guest partition corresponding to an isolated VM guest (IVM guest). In embodiments, the acceptance request identifies (1) a guest memory page that is mapped into a GPA space of the guest partition, and (2) a memory page visibility class. In an example, the GPA integrity control component 205 receives an API call from the guest partition 112 (e.g., originating from the guest enlightenment 119) requesting to accept a memory page (e.g., in reference to a GPA of the memory page) with an expected memory page visibility class (e.g., exclusive visibility, shard read-only visibility, shared read-write visibility).

Method 400 also comprises an act 402 of determining whether a mapped physical memory page meets a requested memory page visibility class. In some embodiments, act 402 comprises determining whether a physical memory page that is mapped to the guest memory page meets the memory page visibility class. In an example, the GPA integrity control component 205 determines what physical memory page maps to the guest memory page indicate by the IVM guest, what memory page visibility class the IVM guest expects, and whether the physical memory page meets that memory page visibility class.

As shown, act 402 includes an act 403 when the memory page visibility class is exclusive visibility (e.g., when the memory page visibility class is the exclusive visibility class), or an act 406 when the requested memory page visibility class is shared visibility (e.g., when the memory page visibility class is the shared read-only visibility class, or when the memory page visibility class is the shared read-write visibility class).

When the requested memory page visibility class is exclusive visibility (act 403), method 400 includes an act 404 of verifying guest exclusivity (via SLAT). In embodiments, act 404 comprises verifying, via one or more guest SLATs, that the physical memory page is exclusively mapped to the guest memory page. For example, as was described, the MAC component 204 enforces a set of rules to ensure the privacy and integrity of exclusive memory, including requiring that an IVM guest's exclusive memory page is only mapped/owned by a single VM guest at a time (e.g., within the SLAT tables 109), and requiring that an IVM guest's exclusive memory page is only mapped to a single GPA of the IVM guest (e.g., within the SLAT tables 109). Thus, in some embodiments, the GPA integrity control component 205 verifies that each of these conditions are true for the physical memory page that is mapped to the requested guest memory page.

When the requested memory page visibility class is exclusive visibility (act 403), method 400 also includes act 405 of verifying no host access (via SLAT). In embodiments, act 405 comprises verifying, via a host OS SLAT, that the host OS is denied access to the physical memory page. For example, as was described, the MAC component 204 enforces host OS visibility by controlling SLAT tables 109 for the host OS 116. Thus, when the host OS 116 allocates a physical memory page and assigns it to an IVM guest for exclusive use by the IVM guest, the MAC component 204 updates SLAT tables 109 for the host OS 116 to prevent access to the memory page by the host OS 116.

Although not shown in FIG. 4, as described, the MAC component 204 can also enforce host OS visibility to a memory page by controlling the IOMMU tables 110 for DMA devices. Thus, some embodiments of act 403 further comprise verifying, via host OS IOMMU table, that a DMA device is denied access to the physical memory page.

As was mentioned in connection with the description of exclusive visibility, there are cases where the guest OS 118 inside of an IVM guest may need to give the host OS 116 access to some of its exclusive memory pages (e.g., for the purposes of I/O), and to facilitate this the MAC component 204 allows an IVM guest to change host visibility on a per-page basis for exclusive memory pages. Thus, some embodiments of method 400 further comprise receiving a visibility change request from the guest partition, the visibility change request including an indication of the guest memory page; and updating the host OS SLAT to grant physical memory page access to the host OS.

In embodiments where the requested memory page visibility class is shared visibility (act 403) such as shared read-only visibility or shared read-write visibility, method 400 includes an act 407 of verifying host shared access (via SLAT). In some embodiments, the memory page visibility class is the shared read-only visibility class, and act 407 comprises verifying that the physical memory page meets the memory page visibility class, including verifying, via a host OS SLAT, that the host OS is granted read-only access to the physical memory page. In other embodiments, the memory page visibility class is the shared read-write visibility class, and act 407 comprises verifying that the physical memory page meets the memory page visibility class, including verifying, via a host OS SLAT, that the host OS is granted read-write access to the physical memory page.

Depending on the outcome of act 402, method 400 also comprises either act 408 of accepting the memory page (when act 402 determines that the mapped physical memory page meets the requested memory page visibility class), or an act 409 of rejecting the memory page (when act 402 determines that the mapped physical memory page does not meet the requested memory page visibility class). In some embodiments, act 408 comprises setting a page acceptance indication for the guest memory page from an unaccepted state to an accepted state based on the physical memory page mapped to the guest memory page meeting the memory page visibility class. In some embodiments, act 409 comprises, setting a page acceptance indication for the guest memory page to an unaccepted state based on the physical memory page mapped to the guest memory page not meeting the memory page visibility class.

As a result of method 400, an IVM guest accepts the physical memory page mapped to an identified guest memory page only when that physical memory page meets an excepted memory page visibility class. In this way, the IVM guest is aware of the security implications of using the identified guest memory page, such as by knowing whether the contents of the guest memory page are exclusive the IVM guest, or whether the contents of the guest memory page may be read from and/or written to by the host OS 116 and/or by another VM guest. This provides the IVM guest the ability to isolate its data from the host OS 116.

As mentioned, the GPA integrity control component 205 protects against the host OS 116 maliciously remapping an IVM guest's memory pages while the IVM guest is using the memory pages. This protection comes by setting the accepted state of the memory page to unaccepted when the host OS 116 changes the physical memory page to which a GPA maps for an IVM guest. Thus, in some embodiments, method 400 further comprises detecting that the guest memory page has been mapped to a different physical memory page; and setting the page acceptance indication for the guest memory page to the unaccepted state.

As mentioned, in embodiments where an IVM guest attempts to access a memory page that it has not previously accepted, the hypervisor 107 generates a fault into the guest (e.g., on X64 platforms, this may be a #VE exception). Thus, in some embodiments, method 400 also comprises, prior to receiving the acceptance request, detecting an access by the guest partition to an address covered by the guest memory page; and generating a page fault based on the page acceptance indication for the guest memory page being the unaccepted state.

As discussed, the memory paging component 206 enforces a defined paging flow, in which the memory paging component 206 records integrity information (e.g., a hash, a checksum) of a memory page's contents during page-out by the host OS 116, and then uses this integrity information to validate the contents of pages on page-in by the host OS 116, thereby protecting against the host OS 116 maliciously modifying the page contents. As such, in some embodiments, method 400 also comprises, based on receiving a page-out request from the host OS that identifies the physical memory page, recording integrity information for contents of the physical memory page; and based on receiving a page-in request from the host OS that includes an indication of the physical memory page, using the integrity information to verify the contents of the physical memory page.

Additionally, as discussed, the memory paging component 206 may also encrypt memory page contents of during page-out, and decrypt the memory page contents of the page during page-in. Thus, in some embodiments, method 400 also comprises, based on receiving the page-out request from the host OS, encrypting the contents of the physical memory page; and based on receiving the page-in request from the host OS, decrypting the contents of the physical memory page.

As discussed, the firmware injection component 207 facilitates firmware injection within the IVM architecture. As discussed in connection with phase 305 of an IVM guest lifecycle, the firmware injection component 207 copies a boot firmware image into the appropriate place in the IVM guest's GPA space, and the firmware injection component 207 (or the GPA integrity control component 205) then changes the state of the GPA memory pages containing the boot firmware image to be accepted, thus allowing the IVM guest to access these boot firmware image memory pages. Thus, in some embodiments, method 400 further comprises, prior to receiving the acceptance request: populating one or more guest memory pages, within the GPA space, with guest boot firmware; and for each memory page in the one or more guest memory pages, setting a corresponding page acceptance indication to the accepted state.

As discussed, in embodiments, as part of unmapping an exclusive memory page from the IVM guest, MAC component 204 wipes the contents of the memory page (e.g., by zeroing the memory page, by writing a pattern of bits to the memory page, by writing random bits to the memory page, by deleting an encryption key associated with the memory page.). Thus, in some embodiments, method 400 also comprises wiping contents of the physical memory page based on at least one of: the guest memory page being released to the host OS; or the isolated VM guest being shut down.

As discussed, the processor state isolation component 202 fully isolates an IVM guest's processor state from the host OS 116, by preventing the host OS 116 from reading from or writing to an IVM guest's registers (including, e.g., the IVM guest's instruction and stack pointers). Thus, in some embodiments, method 400 also comprises isolating contents of one or more processor registers from the host OS.

Embodiments of the disclosure may comprise or utilize a special-purpose or general-purpose computer system that includes computer hardware (e.g., hardware 101), such as, for example, one or more processors (e.g., processor 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module, and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors, cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an OS and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processor, for isolating resources of a virtual machine (VM) guest from a host operating system (OS), the method comprising:

receiving an acceptance request from a guest partition corresponding to an isolated VM guest, the acceptance request identifying:
a guest memory page that is mapped into a guest physical address (GPA) space of the guest partition, and
a memory page visibility class, wherein the memory page visibility class is an exclusive visibility class;
determining that a physical memory page that is mapped to the guest memory page meets the memory page visibility class, including:
verifying, via a guest second-level address translation table (SLAT), that the physical memory page is exclusively mapped to the guest memory page; and
verifying, via a host OS SLAT, that the host OS is denied access to the physical memory page;
setting a page acceptance indication for the guest memory page from an unaccepted state to an accepted state based on the physical memory page that is mapped to the guest memory page meeting the memory page visibility class;
receiving a visibility change request from the guest partition, the visibility change request including an indication of the guest memory page; and
updating the host OS SLAT to grant physical memory page access to the host OS.

2. The method of claim 1, further comprising:
detecting that the guest memory page has been mapped to a different physical memory page; and
setting the page acceptance indication for the guest memory page to the unaccepted state.

3. The method of claim 1, further comprising, prior to receiving the acceptance request:
detecting an access by the guest partition to an address covered by the guest memory page; and
generating a page fault based on the page acceptance indication for the guest memory page being the unaccepted state.

4. The method of claim 1, further comprising, prior to receiving the acceptance request:
populating a guest memory page, within the GPA space, with guest boot firmware; and
setting a corresponding page acceptance indication to the accepted state.

5. The method of claim 1, further comprising verifying, via a host OS input/output memory management unit table, that a direct memory access device is denied access to the physical memory page.

6. The method of claim 1, wherein the acceptance request is a first acceptance request, the guest memory page is a first guest memory page, the memory page visibility class is a first memory page visibility class, and the physical memory page is a first physical memory page, and wherein the method further comprises:
receiving a second acceptance request from the guest partition, the second acceptance request identifying:
a second guest memory page that is mapped into the GPA space of the guest partition, and
a second memory page visibility class, wherein the second memory page visibility class is a shared read-only visibility class; and
determining that a second physical memory page meets the second memory page visibility class, including:
verifying, via a host OS second-level address translation table, that the host OS is granted read-only access to the second physical memory page.

7. The method of claim 1, wherein the acceptance request is a first acceptance request, the guest memory page is a first guest memory page, the memory page visibility class is a first memory page visibility class, and the physical memory page is a first physical memory page, and wherein the method further comprises:
receiving a second acceptance request from the guest partition, the second acceptance request identifying:
a second guest memory page that is mapped into the GPA space of the guest partition, and
a second memory page visibility class, wherein the second memory page visibility class is a shared read-write visibility class; and
determining that a second physical memory page meets the second memory page visibility class, including verifying, via a host OS second-level address translation table, that the host OS is granted read-write access to the second physical memory page.

8. The method of claim 1, further comprising wiping contents of the physical memory page based on at least one of:
the guest memory page being released to the host OS; or
the isolated VM guest being shut down.

9. The method of claim 1, further comprising:
based on receiving a page-out request from the host OS that identifies the physical memory page, recording integrity information for contents of the physical memory page; and
based on receiving a page-in request from the host OS that includes an indication of the physical memory page, using the integrity information to verify the contents of the physical memory page.

10. The method of claim 9, further comprising: based on receiving the page-out request from the host OS, encrypting the contents of the physical memory page; and based on receiving the page-in request from the host OS, decrypting the contents of the physical memory page.

11. The method of claim 1, further comprising isolating contents of a processor register from the host OS.

12. A computer system for isolating resources of a virtual machine (VM) guest from a host operating system (OS), comprising:
a processor; and
a computer storage media that stores computer-executable instructions that are executable by the processor to cause the computer system to at least:
receive an acceptance request from a guest partition corresponding to an isolated VM guest, the acceptance request identifying:
a guest memory page that is mapped into a guest physical address (GPA) space of the guest partition, and
a memory page visibility class, wherein the memory page visibility class is an exclusive visibility class;
determine that a physical memory page that is mapped to the guest memory page meets the memory page visibility class, including:
verifying, via a guest second-level address translation table (SLAT) that the physical memory page is exclusively mapped to the guest memory page; and
verifying, via a host OS SLAT, that the host OS is denied access to the physical memory page;
set a page acceptance indication for the guest memory page from an unaccepted state to an accepted state based on the physical memory page that is mapped to the guest memory page meeting the memory page visibility class;
receive a visibility change request from the guest partition, the visibility change request including an indication of the guest memory page; and
update the host OS SLAT to grant physical memory page access to the host OS.

13. The computer system of claim 12, the computer-executable instructions also including instructions that are executable by the processor to cause the computer system to at least:
detect that the guest memory page has been mapped to a different physical memory page; and
set the page acceptance indication for the guest memory page to the unaccepted state.

14. The computer system of claim 12, the computer-executable instructions also including instructions that are executable by the processor to cause the computer system to, prior to receiving the acceptance request:
populate a guest memory page, within the GPA space, with guest boot firmware; and
set a corresponding page acceptance indication to the accepted state.

15. The computer system of claim 12, the computer-executable instructions also including instructions that are executable by the processor to cause the computer system to wipe contents of the physical memory page based on at least one of:
the guest memory page being released to the host OS; or
the isolated VM guest being shut down.

16. The computer system of claim 12, the computer-executable instructions also including instructions that are executable by the processor to cause the computer system to at least:
based on receiving a page-out request from the host OS that identifies the physical memory page:
record integrity information for contents of the physical memory page; and
encrypt the contents of the physical memory page, and based on receiving a page-in request from the host OS that includes an indication of the physical memory page:
use the integrity information to verify the contents of the physical memory page, and
decrypt the contents of the physical memory page.

17. The computer system of claim 12, the computer-executable instructions also executable by the processor to cause the computer system to, prior to receiving the acceptance request:
detect an access by the guest partition to an address covered by the guest memory page; and
generate a page fault based on the page acceptance indication for the guest memory page being the unaccepted state.

18. The computer system of claim 12, wherein the acceptance request is a first acceptance request, the guest memory page is a first guest memory page, the memory page visibility class is a first memory page visibility class, and the physical memory page is a first physical memory page, and wherein the computer-executable instructions also executable by the processor to cause the computer system to:
receive a second acceptance request from the guest partition, the second acceptance request identifying:
a second guest memory page that is mapped into the GPA space of the guest partition, and a second memory page visibility class, wherein the second memory page visibility class is a shared read-only visibility class; and determine that a second physical memory page meets the second memory page visibility class, including verifying, via a host OS second-level address translation table, that the host OS is granted read-only access to the second physical memory page.

19. The computer system of claim 12, wherein the acceptance request is a first acceptance request, the guest memory page is a first guest memory page, the memory page visibility class is a first memory page visibility class, and the physical memory page is a first physical memory page, and wherein the computer-executable instructions also executable by the processor to cause the computer system to:

receive a second acceptance request from the guest partition, the second acceptance request identifying:
 a second guest memory page that is mapped into the GPA space of the guest partition, and
 a second memory page visibility class, wherein the second memory page visibility class is a shared read-write visibility class; and determine that a second physical memory page meets the second memory page visibility class, including verifying, via a host OS second-level address translation table, that the host OS is granted read-write access to the second physical memory page.

20. A computer-readable hardware storage media medium that stores computer-executable instructions that are executable by a processor to cause a computer system to isolate resources of a virtual machine (VM) guest from a host operating system (OS), the computer-executable instructions including instructions that are executable by the processor to cause the computer system to at least:

receive an acceptance request from a guest partition corresponding to an isolated VM guest, the acceptance request identifying a guest memory page that is mapped into a guest physical address (GPA) space of the guest partition and a memory page visibility class, wherein the memory page visibility class is an exclusive visibility class;

determine that a physical memory page that is mapped to the guest memory page meets a memory page visibility class, including:
 verifying, via a guest second-level address translation table (SLAT), that the physical memory page is exclusively mapped to the guest memory page, and
 verifying, via a host OS SLAT, that the host OS is denied access to the physical memory page;

set a page acceptance indication for the guest memory page from an unaccepted state to an accepted state based on the physical memory page that is mapped to the guest memory page meeting the memory page visibility class;

receive a visibility change request from the guest partition, the visibility change request including an indication of the guest memory page; and update the host OS SLAT to grant physical memory page access to the host OS.

* * * * *